3,158,535
PYRETHRIN-ELASTOMER INSECTICIDAL COMPOSITION AND METHOD

Alan Beerbower, Westfield, Harry W. Rudel, Roselle, and Frederick A. Baumle, Rahway, N.J., assignors to Esso Research and Engineering Company, a corporation of Delaware
No Drawing. Filed Oct. 2, 1961, Ser. No. 142,032
6 Claims. (Cl. 167—24)

The present invention relates to improved pesticide compositions of enhanced entomological activity, and particularly to pesticidal compositions containing very small amounts of natural and synthetic elastomers to markedly improve the performance of insecticidal sprays. More particularly, the instant invention concerns the use of very low concentrations of high molecular weight oil soluble hydrocarbon elastomers with chemical toxicants to promote the killing of crawling and flying insects and other pests.

In the past, various adjuvants have been employed with pesticidal compositions to effect the wetting and spreading and other characteristics of the insecticide composition. Unfortunately, many of these additive agents have proven unsuitable due to the high concentration level required, economic factors, the lowered toxicological properties, their susceptibility to be of varying degrees of acidity and alkalinity, lack of suitable solubility properties, and the like.

It has now been discovered that minor amounts of high molecular weight oil soluble, natural and synthetic, amorphous elastomers are significantly effective in improving the performance of both residual and synergistic pesticidal compositions. In particular, it has been found that hydrocarbonaceous homo- and copolymers of ethylenically unsaturated hydrocarbons that exhibit the elastomeric properties of natural, reclaimed, or synthetic elastomers or rubber promote superior insecticidal activity when incorporated in petroleum oil based pesticidal compositions capable of being sprayed. Hydrocarbon polymers which merely exhibit viscoplastic characteristics such as polyethylene and polypropylene are not suitable for the purpose of the invention due to the absence of the viscoelasticity characteristics and the lack of suitable oil solubility properties in aliphatic hydrocarbon solvents. The elastomers suitable for the purposes of the invention may be defined as those oil soluble synthetic and natural elastomers which are amorphours or noncrystalline at ambient temperatures and pressures and under no strain. These elastomers are soluble or dispersible in oil, particularly aliphatic and aromatic hydrocarbon oils, the term "oil soluble" being used to connote that the elastomer will absorb at least 1000 wt. percent of a solvent. This solubility characteristic of elastomers differs from the formation of true solutions in that it refers to the ability of an elastomer to absorb an indefinite or large amount of solvent, e.g. more than 10,000 wt. percent. The elastomers of the invention may further be defined as linear molecules having little or substantially no cross linking, which for natural rubber is termed unvulcanized, since excessive cross linking adversely affects the desired elastomeric and oil solubility characteristics. These polymers also differ from crystalline nonelastomers by having a different order of magnitude of the modulus of elasticity, i.e. Young's modulus. The Young's modulus of natural rubber in bulk is about $1 \times 10^7$ dynes/cm.$^2$ or less, while that of plastic type polymers is $1 \times 10^9$ dynes/cm.$^2$ or higher. The suitable elastomers also exhibit second order transition temperatures of below ambient or room temperature, i.e. 80° F. or about −160° F. to +40° F., e.g. the second order transition temperature of a typical natural rubber being about −100° F.

The enhancement of insecticidal activity of both residual and nonresidual chemical toxicants by the use of the discovered hydrocarbon elastomers is quite unexpected, since the rubber type elastomeric materials themselves possess extremely little, if any, insecticidal toxicant properties.

The elastomeric, polymeric, rubbery materials employed are generally linear straight or branched chain molecules possessing average molecular weights ranging between $1 \times 10^5$ to $1 \times 10^7$; e.g. $2 \times 10^5$ to $5 \times 10^6$. These products are usually derived from $C_4$ and above monomers and usually contain the hydrocarbon units of

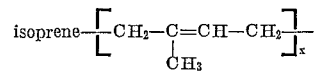

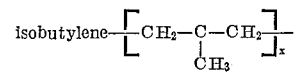

or

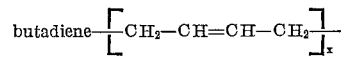

or combination thereof.

The oil soluble elastomers suitable for the purposes of the present invention include all those natural, reclaimed, and synthetic rubbery materials such as those materials prepared by the polymerization of $C_{4-14}$ olefinic hydrocarbons; e.g., $C_4$-$C_7$ mono and diolefins and which possess the viscoelasticity characteristics of rubbery materials. These hydrocarbon elastomers may be homopolymers or copolymers prepared by the copolymerization of mono, di, or poly ethylenically unsaturated organic hydrocarbon monomers such as those having one or more vinyl, vinylene, or vinylidene groups. Particularly suitable hydrocarbon elastomeric materials include Buna S or GRS type of rubbers prepared by the copolymerization of a vinyl aromatic like styrene with a $C_4$ diolefin like butadiene; butyl rubber polyolefins such as polyisobutylenes, polybutenes, polyisoprene, polybutadiene and the like. Any elastomers possessing suitable oil solubility and elastomeric characteristics may be employed, such as halogenated elastomers and the like. Elastomers such as halogenated butyl rubber prepared as in, for example, U.S. Patent 2,943,664, polychloroprene, polyurethanes, nitrile elastomers prepared from the copolymerization of butadiene and acrylonitrile, polysulfides, e.g. thiokol type rubber, etc., although such elastomeric materials are usually excluded from employment due to their inherent lact of oil solubility, but may be employed to the extent soluble alone or in combination with the hydrocarbon elastomers. For example, normally chlorinated butyl rubber is relatively insoluble, but butyl rubber having less than 10 wt. percent of chlorine, e.g. 2–8% may be usefully employed.

The preferred materials are those unvulcanized hydrocarbon elastomers of natural and synthetic rubber, either in latex form or dissolved in a hydrocarbon solvent or in an oil concentrate or combination thereof. Natural rubber comprises those high and low grade rubbery materials or elastic substances obtained from the coagulated milky juice of Hevea and Ficus species. It normally contains the isoprene hydrocarbon unit, and may contain, depending on the grade and source, from 93–25% hydrocarbons; e.g. 93–90%, 2–60% resins; e.g. 2–4%, and water and impurities of 3–15%; e.g. 3–8%. The elastomer may be used in latex form e.g. latex solution of 20 to 60 wt. percent with an average particle size of less than 10 microns, or dry latex, in hydrocarbon solutions, or in solid chunk form.

Synthetic rubber and particularly butyl rubber comprises a copolymer of about 85–99.5% preferably 95–99.5%; e.g. 98–99% of a $C_4$-$C_8$ olefin preferably a $C_4$–$C_7$ monoisoolefin such as isobutylene and the remainder being a $C_4$–$C_{14}$ multiolefin preferably a $C_4$–$_6$ conjugated diolefin such as diene like hexadiene and butadiene, a $C_1$–$C_3$ alkyl substituted diolefin like dimethyl butadiene or, especially, isoprene. Butyl rubber may be prepared at low temperatures with a Friedel-Crafts catalyst such as anhydrous aluminum chloride. High purity is desirable in both materials, and it is preferable to use an isobutylene of at least 99% purity, although satisfactory copolymers can be made of materials of considerably lower purity. The mixture of monomers may be cooled to a temperature within the range of between −40° C. and −164° C., the preferred range being between −78° C. and −103° C.

The cold mixture is then polymerized by the addition of a Friedel-Crafts catalyst, preferably in a liquid or dissolved form. Ordinarily an amount of catalyst ranging from 0.15% to about 1.0% of the weight of the mixed olefins is required to polymerize them into a high molecular weight polymer.

In the polymerization reaction, the liquid catalyst may be sprayed on to the surface of the rapidly stirred, cold olefinic material, or a small, high pressured stream of catalyst may be directed into the body of the rapidly stirred mixture.

The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol or some other compound to inactivate the catalyst. The warm water serves the purpose of flashing off the excess refrigerant, the unpolymerized olefins and the catalyst solvent. The polymer is then recovered from the water suspension by any convenient manner, such as straining or filtering, or otherwise as may be convenient. The polymer is then dried either as a blanket passing through a tunnel drier or on a mill. The preparation and properties of suitable synthetic and butyl rubber are set forth in U.S. Patent 2,356,128 and in the book "Synthetic Rubber," by G. S. Whitby, John Wiley and Sons, 1954, which are hereby incorporated by reference.

The product is a plastic and elastic material. The butyl rubber is normally characterized by a Wijs iodine number between about 1 and 20, and a maximum iodine number of about 60, the preferred iodine number being about 7 to 15. The rubber polymer may then be dissolved in a suitable solvent, such as liquid petroleum hydrocarbon oil boiling in the range between 75 and 90° F.; e.g. 150–700° F. but preferably an aliphatic hydrocarbon of 6 to 8 carbon atoms; e.g. hexane, heptane, octane and isooctane. Other solvents can be employed, such as the nonanes, the decanes, naphtha fractions, benzene, toluene, Varsol, Solvesso 100 (a substantially 100% aromatic hydrocarbon fraction boiling 315° to 350° F.), and Solvesso 150 (a substantially 100% aromatic hydrocarbon fraction boiling 365° to 415° F.), cyclohexane, and cyclohexene, carbon tetrachloride, deodorized kerosene, light fuel oils, trichloroethylene, carbon disulfide, methyl ethyl ketone, isoparaffinic petroleum fractions boiling between 250 and 600° F. and the like, or combinations thereof.

If natural rubber is employed the latex form is added to the above solvents and the water removed by azeotropic distillation thereby forming a solvent solution of the natural rubber.

The oil soluble polymeric materials of this invention may be used to enhance the entomological properties of those well known organic and inorganic synthetic and natural chemical toxicants and insecticides. These materials may include synergists and knock-down agents and also those compounds having residual toxicant effects and combinations and mixtures thereof, such as synthetic halogenated, e.g. chlorinated hydrocarbon organic compounds such as chlorinated alicyclic and aromatic hydrocarbons, organic phosphorus compounds, such as functional adducts of thiophosphoric acid esters, organic nitrogen compounds, thiocyanates, natural organic insecticides like pyrethrins with and without synergists such as piperonyl butoxide, sulfoxide, etc., nicotene, rotenone and their derivatives, inorganic insecticides like arsenious oxide, calcium, copper and lead arsenates and arsenites, the alkali metal fluosilicate, fluorides, etc. These chemical toxicants may operate as contact, ingestion, or stomach type insecticides or both. The rubbery elastomeric materials of the invention are also effective in enhancing the effectiveness of petroleum oils such as various aromatic petroleum oil fractions used as mild insecticides like methyl substituted naphthenes, coal tar fractions, and particularly those virgin aromatic petroleum fractions boiling in the range of about 300 to 625° F., 450 to 535° F., and containing about 80 to 95% aromatics as described in U.S. Patent 2,898,263.

Specific insecticidal toxicants and synergists suitable for use in conjunction with the elastomeric materials include carboxylic acid esters like pyrethrins and allethrin, and also cyclethrin, insecticidal thiocyanates, like isobornyl thiocyanoacetate or butoxythiocyano diethylether, piperonyl butoxide, sulfoxide (n-octyl sulfoxide of isosafrole and related compounds), Octacide (n-octylbicycloheptene), Strobane (polychlorides of camphene, pinene and related terpenes) Perthane (diethyl-diphenyl dichloroethane), Dieldrin (hexachloroepoxyoctahydro-dimethanonaphthalene and related compounds), Heptachlor (1 or 3a,4,5,6,7,8,8-heptachloro-3a,4,7,7a-tetrahydro - 4,7-methanoindene), Malathion (O,O-dimethyl dithiophosphate of diethyl mercaptosuccinate), sesame oil, DDT, Methoxychlor (1,1,1 - trichloro-2,2-bis(p-methoxyphenyl ethane), Parathion (O,O-diethyl-O-p-nitrophenylthiophosphate), benzene hexahydrochloride, Lindane gamma isomer of 1,2,3,4,5,6-hexachlorocyclohexane), Chlordane (1,2,4,5,6,7,8,8-octachloro-4,7 - methane - 3a,4,7,7a-tetrahydroindene and related compounds). The above chemical toxicants are illustrative insecticides which can be usefully employed with the elastomers of this invention and are not restrictive and are not intended to impose limitations on the toxicants which may be used with the elastomer of this invention.

Depending on the specific agents used, such toxicants and synergists, or various combinations thereof, may be included in the novel compositions in concentrations which may range from about 0.0125 to 30 wt. percent, e.g. about 0.025 to 8%. The carrier for the insecticides and the elastomers may include oil in water or water in oil emulsions, or petroleum oil carriers. The liquid petroleum distillate fraction employed may include any of the solvents employed to solubilize the rubber elastomer or combination thereof. The solvents normally employed are those liquid hydrocarbon oils or fractions boiling between 250 and 600° F. For instance, pyrethrins, allethrins, and the like are generally used in concentrations of 0.025 to about 0.5%, piperonyl butoxide and the like in the range of about 0.2 to 2%, thiocyanates in the range of about 0.5 to 3%, Strobane, Perthane and the like in the range of about 0.2 to 8%, and so forth. It will be understood that suitable concentrations are readily determined by those skilled in the art and that the foregoing figures have been listed here primarily for purposes of illustration rather than limitation.

The above insecticides are generally effective against crawling and flying insects which include bedbugs, flies, roaches such as German cockroaches, Periplaneta and oriental roaches, mosquitoes, lice, beetles, weevils, ants, termites, clothes moths, silver fish, carpet beetles, and the like.

The improved pesticide compositions of this invention may be applied in the form of a spray, aerosol mist or fog, by means of conventional spray equipment, a pressurized volatile halohydrocarbon propellant, an air propelled mist blower, or a fog generator or other suitable means. The insecticides may be employed as an oil concentrate employing a suitable petroleum solvent such as light mineral oil or deodorized kerosene as previously used for the solution of the milky elastomer, or as an emulsion concentrate, either oil in water or water in oil, by means of suitable emulsifying or surface active agents.

The effectiveness of the present invention is demonstrated by the following examples employing extremely small amounts of elastomers such as a butyl rubber and a natural rubber latex.

The butyl rubber derived from isobutylene and butadiene was employed as a 23.0 wt. percent solution in hexane. The butyl polymer had the following properties:

| | |
|---|---|
| Mol. wt. | 450,000 |
| Density | 0.91 |
| Refractive index | 1.5045 |

The natural rubber was obtained in the latex form having 61.4 wt. percent solids. This material was made into a 25 wt. percent concentrate in hexane by removing the water by azeotropic distillation. The latex itself had the following properties:

| | |
|---|---|
| Mol. wt. | 3,000,000 |
| Density | 0.92 |
| Refractive index | 1.504 |

EXAMPLE 1

The standard test for evaluating insecticidal activity against crawling insects is the Official CSMA Cockroach Spray Test Method, modified to make knockdown observations at selected intervals. The test procedure is described in Soap and Specialties Blue Book, 1959, page 217. In brief, 20 cockroaches (German adult males) are sprayed with 0.4 ml. of insecticide solution (from a specified distance with standard spray equipment) and the rate of knockdown as well as 24 hr. and 48 hr. mortality data determined. The test is duplicated 10 times and average data recorded. Comparative data on formulations comprising 114.8 mg. pyrethrins dissolved in 100 ml. of an isoparaffinic solvent (400/500° F. boiling range) with and without the addition of natural and butyl rubber are shown below.

*Table I*

EFFECT OF RUBBER ADDITIVE IN RESIDUAL INSECTICIDE TEST

| Elastomeric Additive | CSMA Cockroach Spray Test | | | | | |
|---|---|---|---|---|---|---|
| | Knockdown (Percent) | | | | Dead and Moribund (Percent) | |
| | 5′ | 10′ | 20′ | 60′ | 24 hr. | 48 hr. |
| None | 98 | 99 | 100 | 93 | 55 | 58 |
| 0.10 Wt. Percent Natural Rubber [1] | 100 | 100 | 100 | 100 | 96 | 96 |
| 0.10 Wt. Percent Butyl Rubber [1] | 100 | 100 | 100 | 100 | 94 | 94 |

[1] On actual rubber basis.

The foregoing data demonstrate the remarkable effectiveness of the addition of natural and butyl rubber in promoting the entomological characteristics of a natural organic nitrogen ester type insecticide such as a pyrethrin. The pyrethrin is a recognized knockdown agent, and the addition of the elastomer additives provides only a very slight increase in knockdown ability, but very considerably improves its residual toxicity. It is well known that pyrethrins are relatively poor in residual effectiveness; i.e. a high percentage of paralyzed insects become active in the 24 to 48 hour revival period. The addition of very low quantities of both natural and butyl rubber promotes a surprising and superior increase in crawling insect mortality during this revival interval.

EXAMPLE 2

In formulating a commercial insecticide, it is desirable to maintain the pyrethrins concentration at a low level because of its excessive cost. Residual toxicants are incorporated into the formulation to provide a high level of mortality on extended contact. Two commercially well known and accepted formulations designed to provide a good degree of knockdown and a high level of residual activity are shown below:

| Formulation A— | Percent |
|---|---|
| Pyrethrins | 0.0125 |
| Sulfoxide [1] | 0.1000 |
| Malathion | 1.0000 |
| Dieldrin | 0.4000 |
| Petroleum distillate | 98.4875 |

[1] Pyrethrins synergist.

| Formulation B— | Percent |
|---|---|
| Pyrethrins | 0.032 |
| Piperonyl butoxide [2] | 0.080 |
| Thanite | 1.000 |
| DDT | 1.750 |
| Lindane | 0.075 |
| Petroleum distillate | 97.063 |

[2] Pyrethrin synergist.

These formulations are commercially employed against the crawling and flying insects such as the common housefly, roaches, mosquitoes, silver fish, bedbugs, gnats, etc.

The effect of adding small concentrations of butyl rubber to each of the above formulations upon their insecticidal activity is indicated by the following data:

*Table II*

EFFECT OF RUBBER ADDITIVE IN A RESIDUAL INSECTICIDE COMPOSITION

| Elastomer Additive | CSMA Cockroach Spray Test | | | | | |
|---|---|---|---|---|---|---|
| | Knockdown (Percent) | | | | Dead and Moribund (Percent) | |
| | Time (in minutes) | | | | | |
| | 5′ | 10′ | 20′ | 60′ | 24 hr. | 48 hr. |
| (Formula A) [1] | | | | | | |
| None | 47 | 20 | 93 | 99 | 100 | 100 |
| 0.10% Butyl Rubber | 55 | 46 | 99 | 100 | 100 | 100 |
| 0.20% Butyl Rubber | 48 | 57 | 98 | 100 | 100 | 100 |
| (Formula B) [2] | | | | | | |
| None | 89 | 85 | 58 | 81 | 84 | 86 |
| 0.10% Butyl Rubber | 91 | 95 | 91 | 98 | 98 | 98 |
| 0.20% Butyl Rubber | 92 | 95 | 86 | 98 | 99 | 99 |

[1] Fort Rucker strain of chlordane resistant German roaches.
[2] Nonresistant strain of German cockroaches.

From these data the beneficial effect of the butyl rubber is apparent both in knockdown data as well as in the ultimate kill in the case of the Formula B tests.

Thus, the addition of as low as 0.1 wt. percent butyl rubber had a beneficial effect on the effectiveness of both residual commercial type formulations.

EXAMPLE 3

The repetition of the test procedures with the insecticidal composition of Examples 1 and 2 having incorporated therein about 0.15 wt. percent of a polybutene, a liquid hydrocarbon comprising about 85–98% wt. of monoolefins having a SSU viscosity range of 210° F. of between 500 and 25,000; e.g. 8000 to 15,000 provides enhanced effectiveness of the insecticidal composition.

EXAMPLE 4

The repetition of the test procedures of Examples 1 and 2 with the insecticidal compositions having incorporated therein about 0.12 wt. percent of a GR–S rubber prepared by the emulsion polymerization of 75 parts of butadiene with 25 parts of styrene provides insecticidal composition of superior residual toxicity.

EXAMPLE 5

Aerosols, which normally contain about 50 to 90%, e.g. 80 to 90% volatile propellant, a liquefied halogenated $C_1$ to $C_3$ alkane, and 50 to 10%, e.g. 20 to 10% of nonvolatile ingredients, represent another valuable embodiment of the invention. Such an aerosol is illustrated by the following composition:

| | Wt. percent |
|---|---|
| Butyl rubber [1] (active base) | 0.10 |
| Pyrethrins | 0.25 |
| Piperonyl butoxide | 1.00 |
| DDT | 2.00 |
| Deodorized kerosene base | 11.65 |
| Trifluoro-monochloromethane | 42.50 |
| Difluoro-dichloromethane | 42.50 |

[1] Derived from the low temperature anhydrous $AlCl_3$ polymerization of a 98.5 wt. percent isobutylene and 1.5 wt. percent of isoprene to give a 25.0 wt. percent reduction in hexane. The butyl rubber has a Wijs iodine number of about 16, an average molecular weight of 650,000, and a modulus of elasticity of about $1 \times 10^7$ dynes/cm.

This composition when tested using the CSMA Official Aerosol Test Method for Flying Insects (Proceedings, Chem. Specialties Manufacturing Association, 1953, pages 50–53), will give superior insecticidal effectiveness against flying insects such as the common housefly, mosquitoes, gnats, and the like.

EXAMPLE 6

A pressurized moth spray of enhanced moth protection activity and residual effectiveness may be prepared as follows:

| | Wt. percent |
|---|---|
| Virgin aromatic extract fraction of 90% aromatics, initial boil point 464° F., final boiling point 532° F. | 25.0 |
| Strobane | 5.0 |
| Polyisobutylene having an average molecular weight of $1.3 \times 10^6$ | 0.2 |
| Base oil | 29.8 |
| Dichloro-difluoromethane | 40.0 |

The foregoing thus demonstrates the discovery that the effectiveness of pesticidal compositions may be considerably enhanced by the addition of high molecular weight hydrocarbon elastomers. It is, of course, recognized that the invention is not limited to the exact pesticidal compositions shown for illustrative purposes, but is intended to cover all substitutions, modifications, and equivalents within the scope of the following claims.

What is claimed is:

1. An improved method for killing insects, which method comprises: spraying on said insects an insecticidal composition containing a small amount of a pesticidal toxicant comprising pyrethrins and a small amount of a compound sufficient to enhance the insecticidal characteristics of said composition of an oil soluble, high molecular weight, amorphous, essentially linear hydrocarbon compound selected from a group consisting of unvulcanized natural rubber and synthetic elastomers obtained by the polymerization of from 85 to 99.5 weight percent of a $C_4$ to $C_8$ olefin with a $C_4$ to $C_{14}$ multiolefin.

2. An improved pesticidal composition capable of being sprayed comprising: a major amount of a liquid carrier medium, a minor amount of a pesticidal toxicant comprising pyrethrins, and a small amount sufficient to enhance the pesticidal characteristics of said composition of unvulcanized natural rubber.

3. An improved pesticidal composition capable of being sprayed comprising: a major amount of a liquid petroleum carrier, a minor amount of a pesticidal toxicant comprising pyrethrins, and a small amount sufficient to enhance the pesticidal activity of said composition of copolymer of about 85 to 99.5 weight percent of a $C_4$ to $C_8$ olefin and the remainder being a $C_4$ to $C_{14}$ multiolefin.

4. A composition according to claim 3 wherein said copolymer has a molecular weight of from $1 \times 10^5$ to $1 \times 10^7$.

5. An improved pesticidal composition capable of being sprayed comprising: a major amount of a petroleum distillate carrier, a minor amount of a pesticidal toxicant comprising pyrethrins, and a small amount sufficient to enhance the pesticidal characteristics of said composition of a copolymer of from 85 to 99.5 weight percent of isobutylene and the remainder being butadiene.

6. A composition according to claim 5 wherein said minor amount of a pesticidal toxicant comprises from 0.0125 to 30 wt. percent pyrethrins.

References Cited in the file of this patent

UNITED STATES PATENTS

| 2,051,840 | Gerhart | Aug. 25, 1936 |
| 2,061,570 | Frolich et al. | Nov. 24, 1936 |
| 2,322,723 | Young | June 22, 1943 |
| 2,440,781 | Murray | May 4, 1948 |
| 2,497,294 | Cartwright | Feb. 14, 1950 |
| 2,514,714 | Marhofer | July 11, 1950 |
| 2,572,864 | Sumerford et al. | Oct. 30, 1951 |
| 2,621,163 | Coash | Dec. 9, 1952 |
| 2,798,022 | Yowell et al. | July 2, 1957 |

FOREIGN PATENTS

| 208,096 | Australia | Aug. 16, 1956 |
| 656,058 | Great Britain | Aug. 8, 1951 |

OTHER REFERENCES

Block: "Insecticidal Surface Coatings," Soap and Sanitary Chem., March 1948, pages 161–153.